United States Patent
Choi et al.

(10) Patent No.: US 10,277,951 B2
(45) Date of Patent: *Apr. 30, 2019

(54) METHOD OF RECOMMENDING BROADCASTING CONTENTS AND RECOMMENDING APPARATUS THEREFOR IN MULTIMEDIA CONTENTS REPRODUCING DEVICE

(71) Applicant: SAMSUNG ELECTRONICS CO., LTD., Suwon-si, Gyeonggi-do (KR)

(72) Inventors: Chang-hwan Choi, Seoul (KR); Noel O'Conner, Glasnevin Dublin (IE); Jun-ki Kim, Gimje-si (KR); Cathal Gurrin, Co Dublin (IE); Sorin Sav, Dublin (IE)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/882,965

(22) Filed: Oct. 14, 2015

(65) Prior Publication Data
US 2016/0044381 A1 Feb. 11, 2016

Related U.S. Application Data

(63) Continuation of application No. 12/385,917, filed on Apr. 23, 2009, now Pat. No. 9,185,348.
(Continued)

(30) Foreign Application Priority Data

Oct. 29, 2008 (KR) ........................ 10-2008-0106573

(51) Int. Cl.
*H04N 5/445* (2011.01)
*H04N 7/16* (2011.01)
(Continued)

(52) U.S. Cl.
CPC ......... *H04N 21/4826* (2013.01); *H04N 5/445* (2013.01); *H04N 5/44543* (2013.01);
(Continued)

(58) Field of Classification Search
None
See application file for complete search history.

(56) References Cited

U.S. PATENT DOCUMENTS 5,619,555 A * 4/1997 Fenton .................. H04M 3/563
379/196
6,212,548 B1 * 4/2001 DeSimone .......... H04L 12/1813
709/204
(Continued)

FOREIGN PATENT DOCUMENTS

CN 1329795 A 1/2002
CN 1507266 A 6/2004
(Continued)

OTHER PUBLICATIONS

International Search Report dated Dec. 9, 2009 in corresponding International Patent Application PCT/KR2009/002152.
(Continued)

*Primary Examiner* — Jonathan V Lewis
(74) *Attorney, Agent, or Firm* — Staas & Halsey LLP

(57) ABSTRACT

Provided are a method and apparatus for recommending broadcasting contents by using a multimedia contents reproducing device, the method including the operations of generating a user list about one or more second users related to a first user; displaying the user list on a screen of the multimedia contents reproducing device; selecting at least a third user from among the one or more second users in the user list; and transmitting a recommendation message to the third user, wherein the recommendation message is related to recommending a first broadcasting content currently
(Continued)

being watched by the first user, or a second broadcasting content selected from an Electronic Program Guide (EPG).

18 Claims, 7 Drawing Sheets

Related U.S. Application Data

(60) Provisional application No. 61/071,365, filed on Apr. 24, 2008.

(51) Int. Cl.

| | | |
|---|---|---|
| *H04N 7/173* | (2011.01) | |
| *H04N 21/25* | (2011.01) | |
| *H04N 21/258* | (2011.01) | |
| *H04N 21/2668* | (2011.01) | |
| *H04N 21/442* | (2011.01) | |
| *H04N 21/45* | (2011.01) | |
| *H04N 21/466* | (2011.01) | |
| *H04N 21/475* | (2011.01) | |
| *H04N 21/4788* | (2011.01) | |
| *H04N 21/482* | (2011.01) | |
| *H04N 21/488* | (2011.01) | |

(52) U.S. Cl.
CPC ......... *H04N 7/163* (2013.01); *H04N 7/17309* (2013.01); *H04N 21/25* (2013.01); *H04N 21/252* (2013.01); *H04N 21/25866* (2013.01); *H04N 21/25875* (2013.01); *H04N 21/25891* (2013.01); *H04N 21/2668* (2013.01); *H04N 21/44222* (2013.01); *H04N 21/4532* (2013.01); *H04N 21/4668* (2013.01); *H04N 21/4756* (2013.01); *H04N 21/4788* (2013.01); *H04N 21/482* (2013.01); *H04N 21/4821* (2013.01); *H04N 21/4888* (2013.01)

(56) References Cited

U.S. PATENT DOCUMENTS

| | | | |
|---|---|---|---|
| 6,243,142 B1 | 6/2001 | Mugura et al. | |
| 6,536,041 B1 | 3/2003 | Knudson et al. | |
| 6,577,350 B1 | 6/2003 | Proehl et al. | |
| 6,792,448 B1* | 9/2004 | Smith | H04L 12/1827 709/204 |
| 6,934,964 B1 | 8/2005 | Schaffer | |
| 7,188,140 B1* | 3/2007 | Greenspan | H04L 51/046 707/999.001 |
| 7,499,995 B2 | 3/2009 | Armstrong | |
| 7,503,013 B2 | 3/2009 | Donoghue et al. | |
| 7,574,668 B2 | 8/2009 | Nunez et al. | |
| 7,583,957 B2* | 9/2009 | Lee | H04H 60/43 455/414.3 |
| 7,603,683 B2* | 10/2009 | Reto | H04L 29/06027 709/204 |
| 7,895,625 B1* | 2/2011 | Bryan | H04N 5/782 725/46 |
| 7,908,303 B2 | 3/2011 | Fein et al. | |
| 7,917,583 B2 | 3/2011 | Angiolillo et al. | |
| 8,024,765 B2 | 9/2011 | Ramanathan et al. | |
| 8,141,114 B2* | 3/2012 | Conradt | H04N 7/17309 725/44 |
| 8,488,764 B1* | 7/2013 | Swartz | H04M 3/565 370/261 |
| 8,577,723 B2* | 11/2013 | Dear | G06Q 10/10 705/14.4 |
| 8,850,477 B2 | 9/2014 | Schein et al. | |
| 9,037,632 B2* | 5/2015 | Svendsen | G06F 17/30038 709/202 |
| 2002/0046402 A1 | 4/2002 | Akinyanmi et al. | |
| 2002/0078448 A1 | 6/2002 | Wakahara | |
| 2002/0112239 A1 | 8/2002 | Goldman | |
| 2002/0144264 A1 | 10/2002 | Broadus | |
| 2002/0152224 A1 | 10/2002 | Roth et al. | |
| 2002/0184634 A1* | 12/2002 | Cooper | H04N 5/782 725/50 |
| 2002/0199186 A1 | 12/2002 | Ali et al. | |
| 2003/0002849 A1* | 1/2003 | Lord | H04N 5/76 386/201 |
| 2003/0066074 A1 | 4/2003 | Zimmerman et al. | |
| 2003/0093790 A1* | 5/2003 | Logan | G06F 17/30265 725/38 |
| 2003/0233424 A1* | 12/2003 | Seo | G08C 17/02 709/217 |
| 2004/0054729 A1* | 3/2004 | Fukuizumi | H04L 12/1818 709/205 |
| 2004/0096188 A1 | 5/2004 | Kageyama | |
| 2005/0055713 A1* | 3/2005 | Lee | H04N 7/163 725/46 |
| 2005/0066362 A1* | 3/2005 | Rambo | H04L 51/04 725/43 |
| 2005/0141542 A1 | 6/2005 | Handekyn et al. | |
| 2005/0262542 A1* | 11/2005 | DeWeese | H04L 12/1818 725/106 |
| 2006/0040686 A1* | 2/2006 | Lee | H04W 76/45 455/518 |
| 2006/0053449 A1 | 3/2006 | Gutta | |
| 2006/0059260 A1 | 3/2006 | Kelly et al. | |
| 2006/0075432 A1* | 4/2006 | Abbadessa | H04H 60/46 725/46 |
| 2006/0085515 A1* | 4/2006 | Kurtz | H04L 51/04 709/207 |
| 2006/0109854 A1* | 5/2006 | Cancel | H04N 5/765 370/401 |
| 2006/0168007 A1 | 7/2006 | Peters | |
| 2006/0184579 A1* | 8/2006 | Mills | H04N 7/173 |
| 2006/0221235 A1* | 10/2006 | Kusumoto | H04N 5/44591 348/553 |
| 2006/0271959 A1* | 11/2006 | Jacoby | H04N 7/17318 725/46 |
| 2006/0271961 A1 | 11/2006 | Jacoby et al. | |
| 2006/0271997 A1 | 11/2006 | Jacoby et al. | |
| 2006/0282789 A1 | 12/2006 | Kim | |
| 2006/0282856 A1* | 12/2006 | Errico | G06F 17/30035 725/46 |
| 2007/0019926 A1 | 1/2007 | Lee | |
| 2007/0028266 A1 | 2/2007 | Trajkovic et al. | |
| 2007/0050452 A1* | 3/2007 | Raju | H04L 12/1813 709/204 |
| 2007/0198648 A1* | 8/2007 | Allen | G06Q 10/109 709/207 |
| 2007/0199025 A1* | 8/2007 | Angiolillo | H04N 21/4113 725/47 |
| 2007/0204287 A1* | 8/2007 | Conradt | H04N 7/17309 725/28 |
| 2007/0233291 A1* | 10/2007 | Herde | G06Q 10/02 700/91 |
| 2007/0243936 A1* | 10/2007 | Binenstock | G06Q 30/02 463/42 |
| 2007/0245382 A1 | 10/2007 | Doi et al. | |
| 2007/0250863 A1 | 10/2007 | Ferguson | |
| 2007/0250864 A1* | 10/2007 | Diaz Perez | G06Q 30/02 725/52 |
| 2007/0277217 A1 | 11/2007 | Chiang | |
| 2008/0201735 A1* | 8/2008 | Sumiyoshi | H04N 21/44222 725/34 |
| 2008/0244655 A1* | 10/2008 | Mattila | G06Q 30/02 725/46 |
| 2008/0244681 A1 | 10/2008 | Gossweiler et al. | |
| 2008/0270561 A1 | 10/2008 | Tang et al. | |
| 2009/0019488 A1* | 1/2009 | Ruiz-Velasco | G06F 3/0482 725/43 |
| 2009/0077220 A1* | 3/2009 | Svendsen | G06F 17/30743 709/224 |
| 2009/0125937 A1* | 5/2009 | Verhaegh | H04N 7/163 725/38 |
| 2009/0177744 A1* | 7/2009 | Marlow | G06Q 10/10 709/204 |

(56) References Cited

U.S. PATENT DOCUMENTS

| | | | |
|---|---|---|---|
| 2009/0193345 A1* | 7/2009 | Wensley | H04L 65/4015 715/756 |
| 2009/0241160 A1 | 9/2009 | Campagna et al. | |
| 2009/0254942 A1 | 10/2009 | Matsuzaki | |
| 2009/0271820 A1 | 10/2009 | Choi et al. | |
| 2009/0307726 A1* | 12/2009 | Levin | H04N 5/44543 725/46 |
| 2011/0234746 A1* | 9/2011 | Saleh | G06F 3/041 348/14.03 |
| 2013/0035114 A1 | 2/2013 | Holden et al. | |
| 2018/0077254 A1* | 3/2018 | Appelman | H04L 29/08684 |

FOREIGN PATENT DOCUMENTS

| | | |
|---|---|---|
| CN | 1513261 A | 7/2004 |
| CN | 1561588 | 1/2005 |
| CN | 1656805 | 8/2005 |
| CN | 1947416 | 4/2007 |
| CN | 101119169 | 2/2008 |
| EP | 1694070 A1 | 8/2006 |
| JP | 6-504165 | 5/1994 |
| JP | 10-294904 | 11/1998 |
| JP | 11-225297 | 8/1999 |
| JP | 11-266408 | 9/1999 |
| JP | 2004-194344 | 7/2004 |
| JP | 2005-505192 | 2/2005 |
| JP | 2005-57713 | 3/2005 |
| JP | 2005-78627 | 3/2005 |
| JP | 2005-117226 | 4/2005 |
| JP | 2005-160063 | 6/2005 |
| JP | 2005-165454 | 6/2005 |
| JP | 2007-165454 | 6/2005 |
| JP | 2005-526331 | 9/2005 |
| JP | 2006-108929 | 4/2006 |
| JP | 2006-295572 | 10/2006 |
| JP | 2006-333476 | 12/2006 |
| JP | 2007-123980 | 5/2007 |
| JP | 2007-142643 | 6/2007 |
| JP | 2007-228226 | 9/2007 |
| JP | 2008-67370 | 3/2008 |
| KR | 10-2001-0034608 | 4/2001 |
| KR | 2002-0016537 | 3/2002 |
| KR | 10-2004-0033075 | 4/2004 |
| KR | 10-2005-0007413 | 1/2005 |
| KR | 10-2005-0026312 | 3/2005 |
| KR | 10-2005-0053225 | 6/2005 |
| KR | 10-0609962 | 6/2006 |
| KR | 10-0654445 | 11/2006 |
| KR | 10-0717691 | 4/2007 |
| KR | 10-0745809 | 7/2007 |
| KR | 10-0763180 | 9/2007 |
| KR | 10-2007-0098732 | 10/2007 |
| KR | 10-2007-0100966 | 10/2007 |
| KR | 10-0782872 | 11/2007 |
| TW | 351905 | 2/1999 |
| TW | 460839 | 10/2001 |
| WO | 97/49242 | 12/1997 |
| WO | 99/48287 | 9/1999 |
| WO | WO 99/48287 | 9/1999 |
| WO | 00/62223 | 11/2000 |
| WO | 01/60064 | 8/2001 |
| WO | 03/030418 | 4/2003 |
| WO | 03/036970 A1 | 5/2003 |
| WO | 03/098932 | 11/2003 |
| WO | 2004/052010 A1 | 6/2004 |
| WO | 2005/048587 | 5/2005 |
| WO | WO 2006/066092 A2 | 6/2006 |
| WO | 2006/074304 A2 | 7/2006 |
| WO | 2007/003045 A1 | 1/2007 |

OTHER PUBLICATIONS

European Search Report dated Aug. 31, 2011 issued in correspondence with European Patent Application No. 09158383.1.
European Search Report dated Nov. 29, 2011 issued in related European Patent Application No. 09734083.0.
European Search Report dated Jan. 13, 2012 issued in related European Patent Application No. 09735218.1.
Toon Coppens et al., "AmigoTV: A Social TV Experience Through Triple-Play Convergence", Alcatel, XP002457156, Feb. 2005, pp. 1-9.
Jorge Abreu et al., "2BeOn—Interactive television supporting interpersonal communication", Proceedings of the Eurographics Workshop on Multimedia, Sep. 2001, pp. 1-10.
Hyowon Lee et al., "Balancing Simplicity and Functionality in Designing User-Interface for an Interactive TV", pp. 1-2.
First Chinese Office Action dated May 22, 2012 issued in corresponding Chinese Patent Application No. 200980114498.1.
First Chinese Office Action dated Aug. 10, 2012 issued in corresponding Chinese Patent Application No. 200910139212.7.
First Chinese Office Action dated Jul. 25, 2012 issued in corresponding Chinese Patent Application No. 200980114500.5.
Jorge Abreu et al., "2BeOn—Interactive Television Supporting Interpersonal Communication", Proceedings of the Eurographics Workshop in Multimedia, 2001, pp. 6-16.
International Search Report dated Nov. 24, 2009 issued in corresponding International Patent Application No. PCT/KR2009/002153.
Makoto Hamada et al., "Information-Provision System using Users' History for Ubiquitous Computing and Network Environments", The Institute of Electronics, Information and Communication Engineers, Mar. 2008, pp. 119-122.
Japanese Office Action dated Sep. 4, 2012 in corresponding Japanese Patent Application No. 2011-506204.
Chinese Office Action dated Jan. 18, 2013 in corresponding Chinese Application No. 200980114498.1.
Japanese Office Action dated Jan. 29, 2013 in corresponding Japanese Application No. 2009-106871.
Chinese Office Action dated Apr. 12, 2013 issued in corresponding Chinese Application No. 200980114500.5.
Chinese Office Action dated Jul. 29, 2013 in corresponding Chinese Application No. 200980114498.1.
Japanese Office Action dated Jul. 30, 2013 in corresponding Japanese Application No. 2011-506204.
European Office Action dated Aug. 28, 2013 in corresponding European Application No. 09 734 083.0.
European Office Action dated Aug. 28, 2013 in corresponding European Application No. 09 735 218.1.
European Office Action dated Aug. 22, 2013 in corresponding European Application No. 09 158 383.1.
Chinese Decision of Rejection dated Feb. 18, 2014 in corresponding Chinese Application No. 200980114498.1.
Chinese Office Action dated May 7, 2014 in corresponding Chinese Patent Application No. 200980114500.5.
U.S. Office Action dated Aug. 1, 2014 in corresponding U.S. Appl. No. 12/382,058.
Korean Office Action dated Sep. 22, 2014 in corresponding Korean Patent Application No. 10-2008-0106575.
Korean Office Action dated Aug. 19, 2014 in corresponding Korean Patent Application No. 10-2008-0106573.
Chinese Office Action dated Sep. 30, 2014 in corresponding Chinese Patent Application No. 200980114500.5.
Korean Office Action dated Oct. 23, 2014 in corresponding Korean Patent Application No. 10-2008-0106574.
Korean Office Action dated Feb. 13, 2015 in corresponding Korean Patent Application No. 10-2008-0106574.
Korean Notice of Allowance dated Mar. 16, 2015 in corresponding Korean Patent Application No. 10-2008-0106575.
Korean Notice of Allowance dated Jun. 4, 2015 in corresponding Korean Patent Application No. 10-2008-0106574.
U.S. Office Action dated Feb. 28, 2011 in related U.S. Appl. No. 12/385,917.
U.S. Office Action dated Aug. 17, 2011 in related U.S. Appl. No. 12/385,917.
Advisory Action dated Nov. 30, 2011 in related U.S. Appl. No. 12/385,917.

(56) References Cited

OTHER PUBLICATIONS

U.S. Office Action dated May 7, 2014 in related U.S. Appl. No. 12/385,917.
U.S. Office Action dated Oct. 6, 2014 in related U.S. Appl. No. 12/385,917.
Notice of Allowance dated Jul. 6, 2015 in related U.S. Appl. No. 12/385,917.
U.S. Appl. No. 12/385,917, filed Apr. 23, 2009, Chang-hwan Choi et al.
Chinese Office Action dated Jul. 13, 2016 in corresponding Chinese Patent Application No. 201310337366.3.
Chinese Office Action, dated Dec. 21, 2015, in corresponding Chinese Application No. 201310337366.3.
Chinese Office Action dated Jan. 20, 2017 in corresponding Chinese Patent Application No. 201310337366.3.
European Summons to Oral Proceedings dated Mar. 23, 2017 in corresponding European Patent Application No. 09158383.1.
Chinese Decision of Rejection dated Jun. 8, 2017 in corresponding Chinese Patent Application No. 201310337366.3.
European Patent Office Communication dated Oct. 25, 2017 in corresponding European Patent Application No. 09734083.0.

* cited by examiner

METHOD OF RECOMMENDING BROADCASTING CONTENTS AND RECOMMENDING APPARATUS THEREFOR IN MULTIMEDIA CONTENTS REPRODUCING DEVICE

CROSS-REFERENCE TO RELATED APPLICATIONS

This application is a continuation of U.S. Ser. No. 12/385,917, filed Apr. 23, 2009, and which is incorporated herein in its entirety by reference. Moreover, this application claims the benefit of U.S. Provisional Patent Application No. 61/071,365, filed on Apr. 24, 2008, in the U.S. Patent and Trademark Office and the benefit of Korean Patent Application No. 10-2008-0106573, filed on Oct. 29, 2008, in the Korean Intellectual Property Office, the disclosure of which is incorporated herein in its entirety by reference.

BACKGROUND

1. Field

One or more embodiments relate to a method of recommending broadcasting contents by using a buddy list, and a recommending apparatus therefor in a multimedia contents reproducing device.

2. Description of the Related Art

With the increase of cable broadcasting channels, the generalization of cable broadcasting, and the increase of users that enjoy watching an Internet Protocol TV (IPTV), the number of user accessible multimedia contents has rapidly increased. Thus, from among the multimedia contents, users hesitate in selecting the multimedia contents or searching the multimedia contents. In this situation, users may be recommended multimedia contents by a specific system and a service. However, a recommendation by a contact of a network of contacts of an individual may be more effective in the selection of multimedia contents than a recommendation by the specific system and the service. For example, a recommendation by a friend interested in entertainment broadcasting programs is more effective in the selection of multimedia contents than a recommendation by a TV commercial seen on the TV.

Also, recently, joining a community to obtain knowledge therefrom has become popular, thus, playing together and enjoying common interests between people has become widespread. According to this trend, a sharing of broadcasting programs by using a social network may give a user a feeling of watching broadcasting content together with others, although they are in different places, so that the sharing of broadcasting programs may form emotions and may satisfy the people sharing the same broadcasting content.

SUMMARY

One or more embodiments include a method of recommending broadcasting contents by using a buddy list, and a recommending apparatus therefor in a multimedia contents reproducing device.

Additional aspects will be set forth in part in the description which follows and, in part, will be apparent from the description, or may be learned by practice of the invention.

To achieve the above and/or other aspects, one or more embodiments may include a method of recommending broadcasting contents by using a multimedia contents reproducing device, the method including the operations of generating a user list about one or more second users related to a first user; displaying the user list on a screen of the multimedia contents reproducing device; selecting at least a third user from among the one or more second users in the user list; and transmitting a recommendation message to the third user, wherein the recommendation message is related to recommending a first broadcasting content currently being watched by the first user, or a second broadcasting content selected from an Electronic Program Guide (EPG).

The operation of generating the user list may further include the operations of registering an account of the first user in an external server connected via a network; retrieving the one or more second users from the external server; and registering the retrieved one or more second users in the account of the first user.

The operation of displaying the user list may include the operation of displaying, from among the one or more second users, only one or more users that are watching the first broadcasting content currently being watched by the first user, or displaying only one or more users that are watching third broadcasting contents that are different from the first broadcasting content currently being watched by the first user.

When only the one or more users that are watching the first broadcasting content currently being watched by the first user are displayed, the operation of displaying the user list may include the operation of also displaying watching time information of each of the one or more users in the user list.

When only the one or more users that are watching the third broadcasting contents that are different from the first broadcasting content currently being watched by the first user are displayed, the operation of displaying the user list may include the operation of also displaying titles of the third broadcasting contents being watched by each of the one or more users in the user list.

The operation of displaying the user list may include the operation of displaying either or both pre-registered images representing the one or more second users in the user list and names of the one or more second users, and displaying the user list on the screen in a translucent manner.

The method may further include the operation of displaying a predetermined icon for notifying an arrival of the recommendation message on a screen of a multimedia contents reproducing device of the third user.

The method may further include the operation of receiving a response message indicating whether the third user that has received the recommendation message agrees to watch the recommended first broadcasting content or the recommended second broadcasting content.

The operation of displaying the user list may include the operation of also displaying, from among the one or more second users in the user list, a predetermined icon for indicating a recommendation refusal by a user that refuses to receive the recommendation message, and the operation of transmitting the recommendation message may include the operation of not transmitting the recommendation message to a user displayed with the predetermined icon for indicating the recommendation refusal.

To achieve the above and/or other aspects, one or more embodiments may include a broadcasting contents recommending apparatus in a multimedia contents reproducing device, the broadcasting contents recommending apparatus including a buddy list generating unit generating a user list about one or more second users related to a first user; a screen output unit displaying the user list on a screen of the multimedia contents reproducing device; a user input unit selecting at least a third user from among the one or more second users in the user list; and a message transmitting unit transmitting a recommendation message to the third user, wherein the recommendation message is related to recommending a first broadcasting content currently being watched by the first user, or a second broadcasting content selected from an EPG.

The buddy list generating unit may further include an account registering unit registering an account of the first user in an external server connected via a network; a buddy retrieving unit retrieving the one or more second users from the external server; and a list managing unit registering the retrieved one or more second users in the account of the first user.

The screen output unit may display, from among the one or more second users, only one or more users that are watching the first broadcasting content currently being watched by the first user, or may display only one or more users that are watching third broadcasting contents that are different from the first broadcasting content currently being watched by the first user.

When only the one or more users that are watching the first broadcasting content currently being watched by the first user are displayed, the screen output unit may also display watching time information of each of the one or more users in the user list.

When only the one or more users that are watching the third broadcasting contents that are different from the first broadcasting content currently being watched by the first user are displayed, the screen output unit may also display titles of the third broadcasting contents being watched by each of the one or more users in the user list.

The screen output unit may display either or both pre-registered images representing the one or more second users in the user list and names of the one or more second users, and may display the user list on the screen in a translucent manner.

The broadcasting contents recommending apparatus may further include a message control unit displaying a predetermined icon for notifying an arrival of the recommendation message on a screen of a multimedia contents reproducing device of the third user.

The broadcasting contents recommending apparatus may further include a response message receiving unit receiving a response message indicating whether the third user that has received the recommendation message agrees to watch the recommended first broadcasting content or the recommended second broadcasting content.

The screen output unit may also display, from among the one or more second users in the user list, a predetermined icon for indicating a recommendation refusal by a user that refuses to receive the recommendation message and that is from among the one or more second users in the user list, and the message transmitting unit may not be able to transmit the recommendation message to a user displayed with the predetermined icon for indicating the recommendation refusal.

To achieve the above and/or other aspects, one or more embodiments may include a computer readable recording medium having recorded thereon a program for executing the method of recommending broadcasting contents.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENTS

Figure 1:
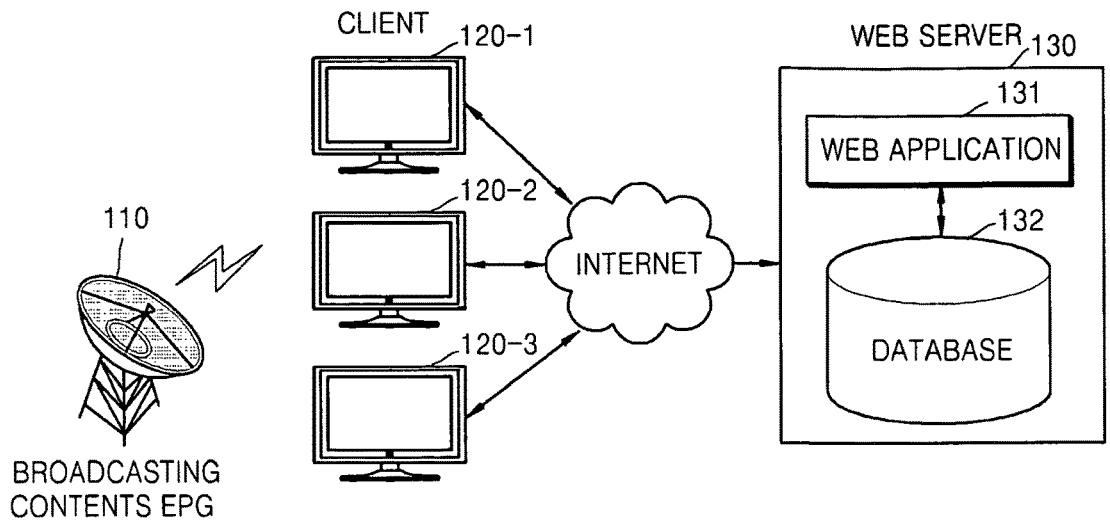
FIG. 1 is a conceptual diagram of a network system to which one or more embodiments are applied.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The present embodiments relate to a method of recommending a broadcasting program and a recommending apparatus therefor which provide a user interface by which message exchange between terminals via a network can be conveniently performed by a terminal such as a portable Digital Multimedia Broadcasting (DMB) player, a mobile phone enabled to receive DMB broadcasting, or a digital TV enabled to reproduce broadcasting programs.

Hereinafter, one or more embodiments will be described in detail by referring to the accompanying drawings.

FIG. 1 is a conceptual diagram of a network system to which one or more embodiments are applied.

Referring to FIG. 1, the network system includes a web server 130 having a web application 131 and a database 132, and clients 120-1 through 120-3. In particular, for a device such as a TV that reproduces/records broadcasting contents, the network system further includes a broadcasting station 110 that transmits broadcasting contents and Electronic Program Guide (EPG) information.

Examples related to conventional technology providing a messenger service between terminals by using a network (e.g., Internet) are a data service of a Network enabled TV, and a Short Message Service (SMS) of an Internet Protocol TV (IPTV).

In the case of the data service of the Network enabled TV, a user registers for a user account and registers a serial number of a TV using a web browser provided from a server. After the user successfully authenticates on the server, the user requests information such as the weather, the stock market, news, and the like, and then the server transmits the information to the TV. The user employing such a service may receive weather information or may read news articles from the TV, without accessing the web browser, but the user may not share or recommend the information with other people. Meanwhile, in the case of the SMS of the IPTV, the IPTV indicates a service that provides an information service, moving picture contents, broadcasting contents, and the like, to a television receiver through high-speed Internet. Here, the IPTV provides the SMS service between terminals using the Internet. The SMS service by the IPTV is performed in the following manner. By using an on-screen keyboard, a user retrieves a unique identification (ID) of a person that is to receive a message, writes a message to be transmitted with the on-screen keyboard, and then transmits the message to a server. The server retrieves the ID of the person in a database, wherein the ID is transmitted from a terminal. In the case where an ID that matches the ID of the person exists in the database, the server obtains an address of a terminal corresponding to the matching ID, and transmits the message to the terminal. However, the SMS service has an interface that is not convenient to a user, since the user has to retrieve another user before the user transmits a message to the other user, and has to use the on-screen keyboard so as to input the message to be transmitted.

Figure 2:
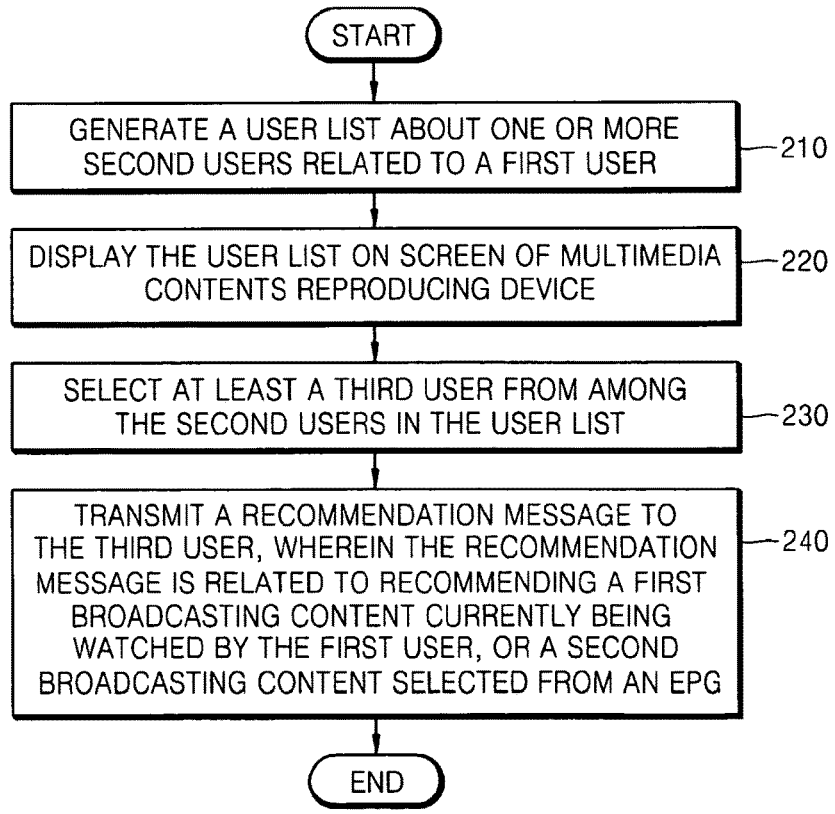
FIG. 2 is a flowchart of a method of recommending broadcasting contents by using a multimedia contents reproducing device, according to an embodiment.

FIG. 2 is a flowchart of a method of recommending broadcasting contents by using a multimedia contents reproducing device, according to an embodiment.

Referring to FIG. 2, the method of recommending broadcasting contents by using the multimedia contents reproducing device according to the embodiment of FIG. 2 includes operations of generating a user list about one or more second users related to a first user (operation 210), displaying the user list on a screen of the multimedia contents reproducing device (operation 220), selecting at least a third user from among the one or more second users in the user list (operation 230), and transmitting a recommendation message to the third user, wherein the recommendation message is related to recommending a first broadcasting content currently being watched by the first user, or a second broadcasting content selected from an EPG (operation 240). Accordingly, by using the generated user list (hereinafter, referred to as a "buddy list"), a user may transmit the recommendation message, which is related to recommending a broadcasting program currently being watched by the user or a broadcasting program selected from EPG information, to buddies included in the buddy list.

A system according to one or more embodiments may be broadly divided into a server and a client. The server corresponds to the web server 130 including the web application 131 and a web service by which an account registering operation, and a buddy registering and managing operation may be actually performed. Information about buddies or personal information is managed by using the database 132 in the web server 130. The web server 130 provides an environment that enables the web application 131 to operate, and allows users that watch broadcasting contents to access pages of the corresponding web application 131 and then to register their own accounts or to retrieve and register their buddies. In addition to the web application 131 operating in the web server 130, the web server 130 provides the web service for receiving a buddy recommendation request and delivering the buddy recommendation request to other buddies, so that the web server 130 allows recommending and sharing activities to be smoothly performed between the buddies.

The client uses a user interface (UI) of an application allowing the UI to display a buddy list, thereby displaying the buddy list. In order to obtain the buddy list, the application uses the web service provided from the web server 130. When the client transmits a request message along with a user login ID and a password to the web service, the web service transmits a buddy list corresponding to the request message to the client, then, the client receives and displays the buddy list on a screen.

In the case where a user desires to recommend a broadcasting program to a buddy while watching the broadcasting program, the user transmits ID information about the buddy to receive a recommendation message and information about the broadcasting program to be recommended to the web service, then, the web service refers to the ID information about the requested buddy and transmits a recommendation message in an Extensible Mark-up Language (XML) stream type to a client application of the requested buddy.

Figure 4:
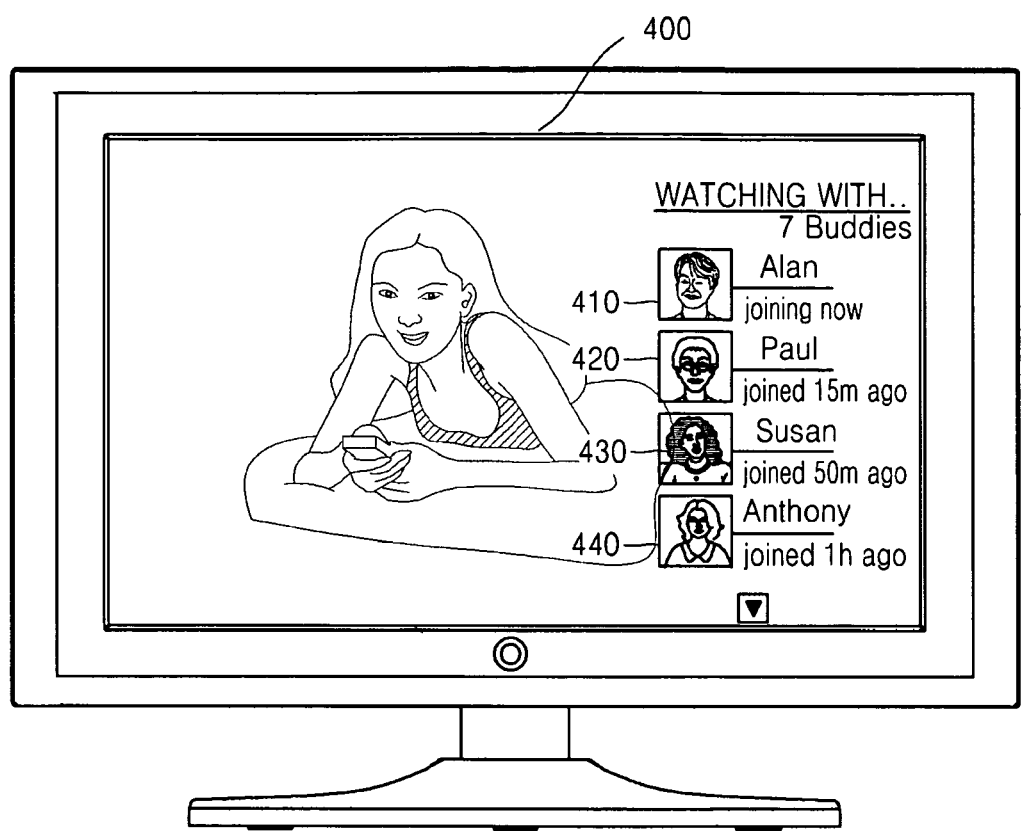
FIG. 4 is a diagram of a buddy list of buddies watching the same broadcasting program as a user, according to an embodiment.
Figure 5:
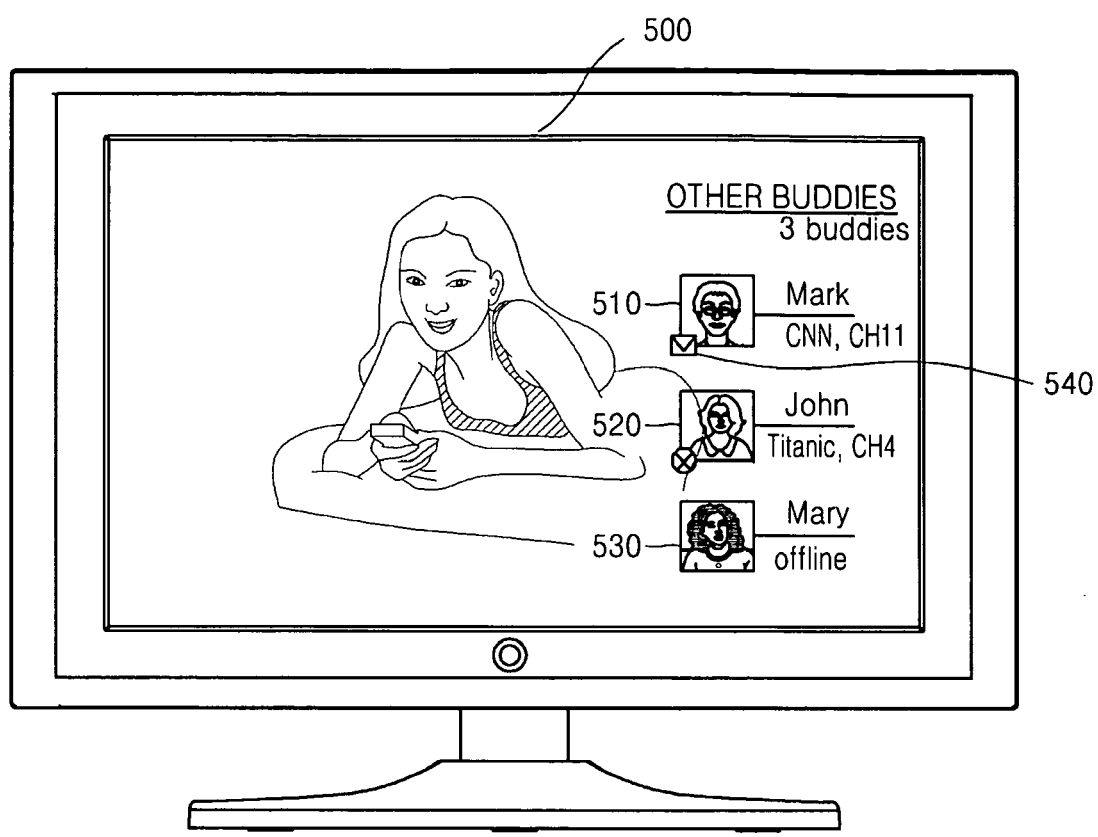
FIG. 5 is a diagram of a buddy list of buddies watching broadcasting programs that are different from the one currently being watched by a user, according to another embodiment.
Figure 6:
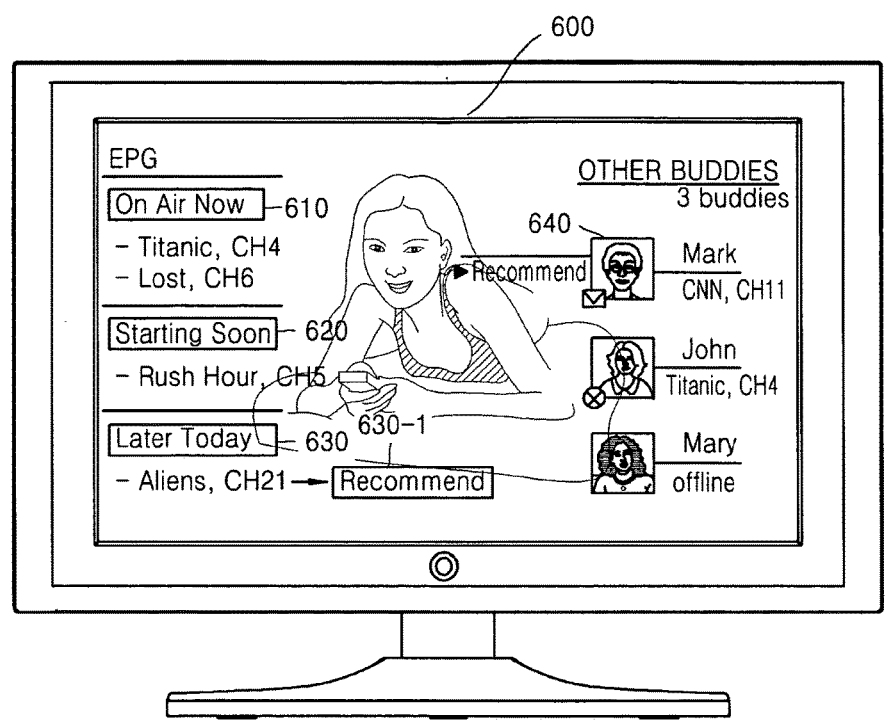
FIG. 6 is a diagram for describing a method of recommending a broadcasting program to a buddy who is watching a broadcasting program different from the one currently being watched by a user.

At this time, from among buddies in the buddy list, it is necessary to classify the buddies into buddies watching the same broadcasting program as the user and buddies watching different broadcasting programs than the user, and to display the classified buddies on the screen. That is, the method of recommending broadcasting contents according to the embodiment of displays the buddy list on the screen according to two different manners. The first manner is to display only buddies which are watching a broadcasting program that is the same as a broadcasting program currently being watched by a user, and which are from among buddies in the buddy list. The second manner is to display only buddies which are watching broadcasting programs different from the broadcasting program currently being watched by the user, and which are from among buddies in the buddy list. The first manner is illustrated in FIG. 4, and the second manner is illustrated in FIGS. 5 and 6. Here, in the case where only the buddies that are watching the broadcasting program that is the same as the broadcasting program currently being watched by the user are displayed on the screen, watching time information about since when each of the buddies started to watch the same broadcasting program may also be displayed on the screen. On the other hand, in the case where only the buddies that are watching the broadcasting programs that are different from the broadcasting program currently being watched by the user are displayed on the screen, titles of the different broadcasting programs currently being watched by the buddies may also be displayed on the screen.

Meanwhile, when a client of the requested buddy agrees to watch the recommended broadcasting program, a response message including feedback data, which indicates that a channel is tuned so that a screen is changed to the recommended broadcasting program and the recommendation request has been accepted, may be notified to a client of the user who first recommended the recommended broadcasting program. For example, the notification may be performed via the web service provided from the web server 130. The client of the user receives the response message about an accepted recommendation, and then displays information about the accepted recommendation on the screen.

Figure 3:
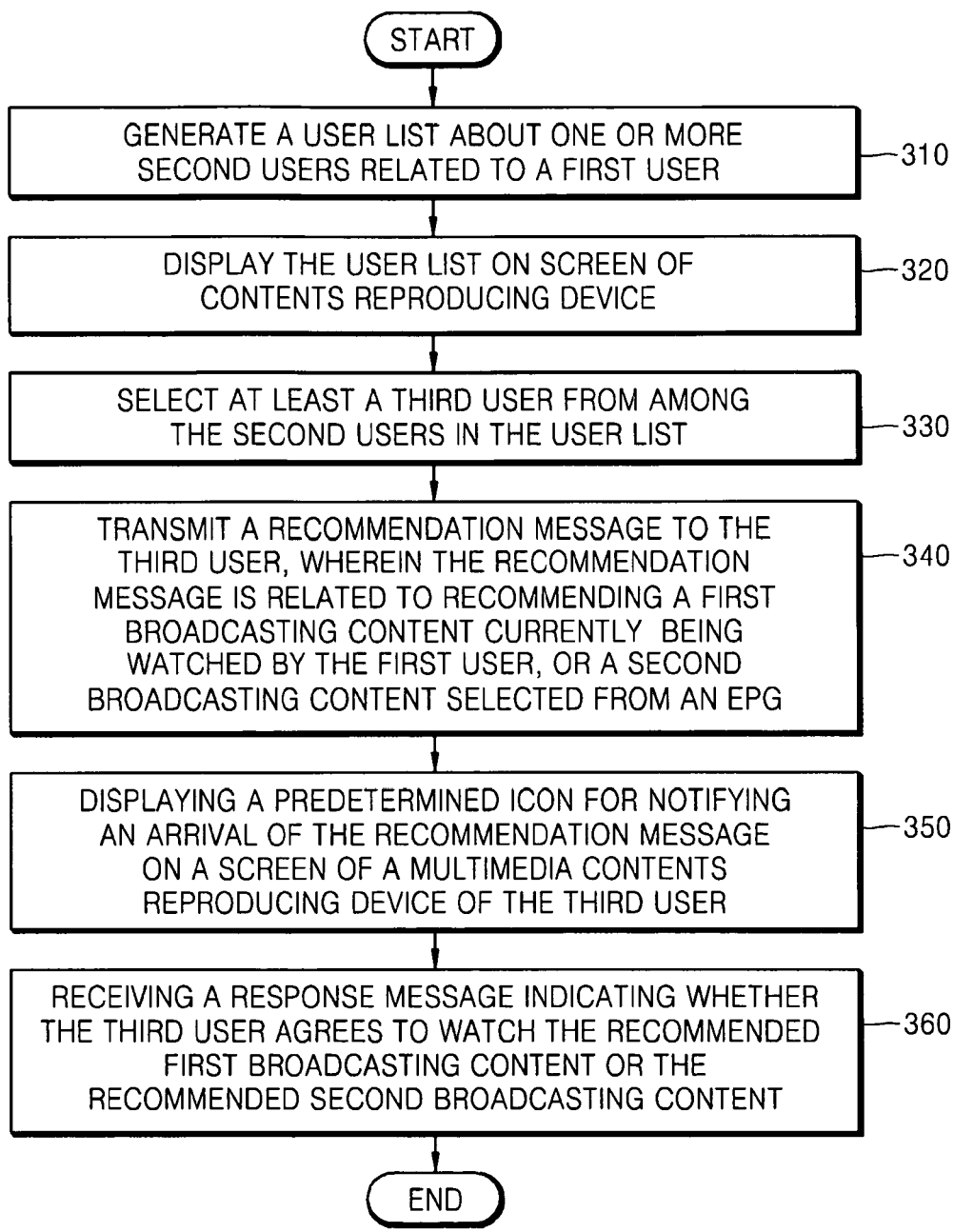
FIG. 3 is a flowchart of a method of recommending broadcasting contents by using a multimedia contents reproducing device, according to another embodiment.

In this regard, FIG. 3 is a flowchart of a method of recommending broadcasting contents by using a multimedia contents reproducing device, according to another embodiment. Operations 310 through 340 are the same as those in the method of FIG. 2.

In operation 350, an icon for notifying an arrival of a recommendation message transmitted from the user is displayed on a screen of the multimedia contents reproducing device of a selected buddy. Referring to FIG. 5, an envelopeshaped icon 540 for notifying an arrival of a recommendation message from Mark 510 is displayed on a screen 500.

In operation 360, the user receives a response message indicating whether the selected buddy that has received the recommendation message agrees to watch the recommended broadcasting program. That is, the user is notified with the response message including feedback data.

As described above, the method according to the one or more embodiments may be performed to obtain the following effects.

First, the method performs buddy account generation and buddy registration, thereby building a social network in a terminal enabled to use a network. The social network of the user may be checked by displaying the buddy list on a screen while the user is watching a broadcasting program. In such a buddy list, pre-registered images and/or buddy names representing each of the buddies may be displayed. By using the buddy list, the user does not need to separately retrieve a buddy when the user sends a program recommendation message.

Second, the method may be performed to send a recommendation message to another user by using a more convenient UI, wherein the other user is watching a broadcasting program that is different from the one currently being watched by the user. The user may select buddies displayed on the screen while the user is watching a broadcasting program, and may recommend the broadcasting program currently being watched by the user to a selected buddy. Meanwhile, as it will be described later with reference to FIG. 5, the user may also select and recommend a broadcasting program from EPG information, as well as the broadcasting program currently being watched by the user.

FIG. 4 illustrates a buddy list of buddies watching the same broadcasting program as a user, according to an embodiment.

Referring to a TV screen 400 of FIG. 4, the buddy list as a (translucent) sub-screen is displayed on a side of the TV screen 400. According to another embodiment, the buddy list may be differently implemented but basically, a buddy list of buddies watching the same broadcasting program as the user is first displayed when a buddy list hot-key (not shown) is pressed. In FIG. 4, the number of buddies watching the broadcasting program that is currently being watched by the user is 7, and it is possible to display a time when each of the buddies (e.g., buddies 410 through 440) started to watch the broadcasting program currently being watched by the user. For example, in the case of the buddy 410, Alan, it is apparent that Alan is about to start watching the broadcasting program currently being watched by the user, and in the case the buddy 420, Paul, it is apparent that Paul has been watching the broadcasting program currently being watched by the user since 15 minutes ago.

FIG. 5 Illustrates a buddy list of buddies watching different broadcasting programs than a user, according to another embodiment.

Referring to FIG. 5, it can be understood that two of the three buddies, Mark, John, and Mary, are watching different broadcasting programs than the user, and the remaining buddy is in an off-line status. In order to transmit a recommendation message about a broadcasting program currently being watched by the user, the user may press a buddy list hot-key (not shown) while watching the broadcasting program, may select a buddy to receive the recommendation message 540 by moving up/down direction keys, and then may recommend the broadcasting program.

FIG. 6 Illustrates recommending a broadcasting program to a buddy who watches a different broadcasting program than a user.

Referring to FIG. 6, the user may select and recommend another broadcasting program from an EPG, instead of selecting and recommending a broadcasting program currently being watched by the user. As described above, a client provides an application that is enabled to exhibit an EPG, and when the application operates, EPG data is extracted from the stream of broadcasting contents. After that, a filtering operation is performed on the extracted EPG data so that program information about a broadcasting program currently being watched by a user via a broadcast channel, program information about broadcasting programs being broadcast in other channels, program information about broadcasting programs currently being broadcast, and program information about broadcasting programs to be broadcast at a later time are displayed. To be more specific, in order to transmit a recommendation message about an EPG broadcasting program, the user may press a EPG hot-key (not shown) while watching a broadcasting program, may select a broadcasting program from a menu item 630 by moving up/down direction keys, and may select a buddy 640 in a buddy list that is to receive the recommendation message, thereby recommending the broadcasting program.

According to the aforementioned operations, the one or more embodiments provides an intuitive UI to the user, thereby allowing the user to easily and conveniently transmit the recommendation message and recommend the broadcasting program.

Figure 7:
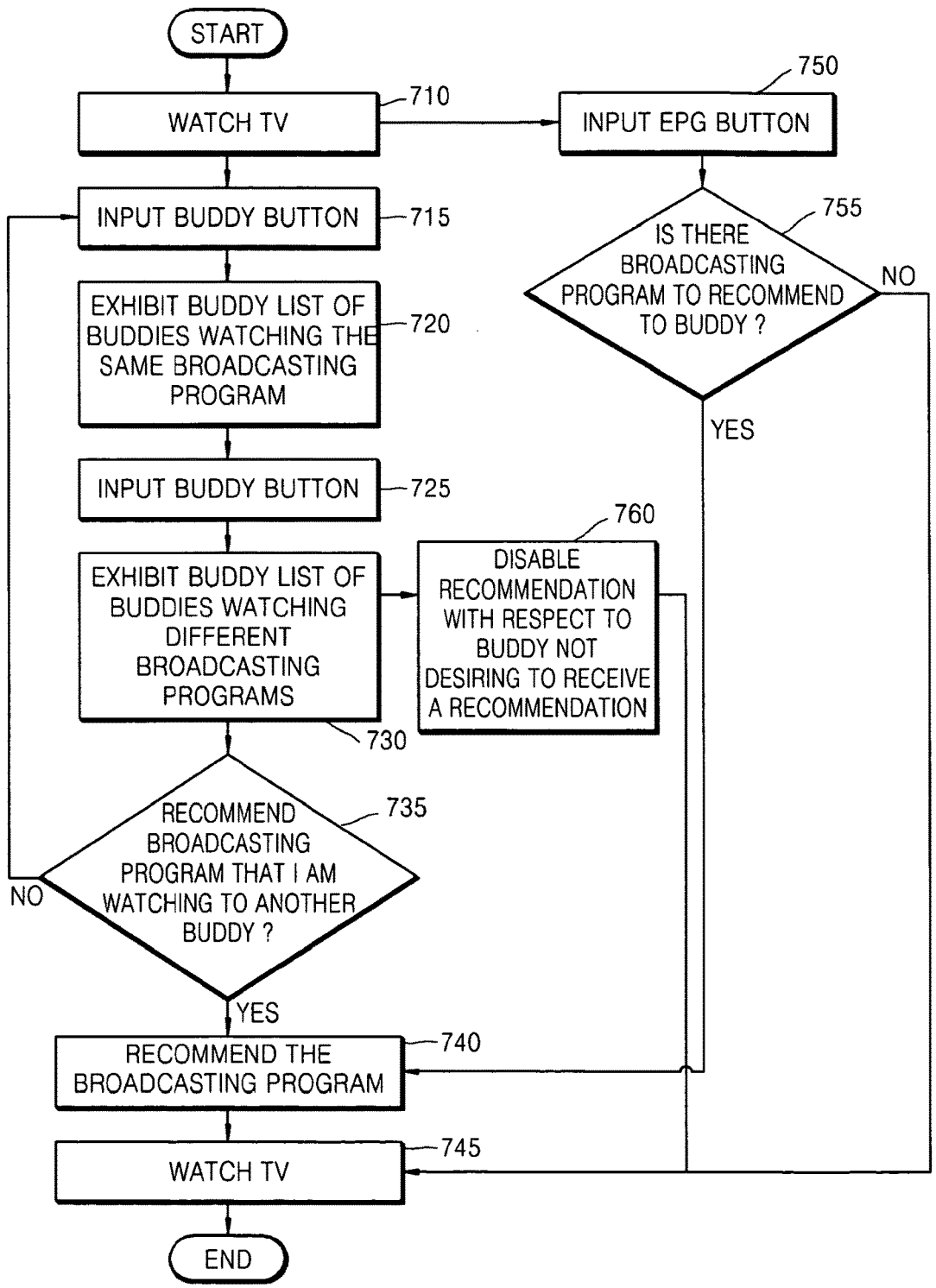
FIG. 7 is a flowchart of a method of recommending broadcasting contents by using a buddy list, according to another embodiment.

FIG. 7 is a flowchart of a method of recommending broadcasting contents by using a buddy list, according to another embodiment.

Operations performed by the method may be broadly divided into a registration process in which a user account is generated and buddies of the user are registered, and a recommendation or notification process in which a terminal recommends or notifies a broadcasting program by using a buddy list.

Referring to FIG. 7, while watching a broadcasting program (operation 710), the user presses a buddies list button (operation 715), and then the buddy list of buddies currently watching the same broadcasting program as the user is exhibited (operation 720). At this time, a time when each of the buddies has started to watch the broadcasting program may be additionally shown in an information window for each of the buddies. For reference, the information window has default information corresponding to a buddy image and a buddy name, and is a translucent window so that the information window does not interrupt a broadcasting program being shown. When the buddy list button is pressed once more (operation 725), a buddy list of buddies watching different broadcasting programs than the user is displayed (operation 730). At this time, titles of the different broadcasting programs respectively being watched by the buddies may be additionally shown in an information window for each of the buddies. The user may refer to such an information window, may recommend the broadcasting program currently being watched by the user to a buddy who is watching one of the different broadcasting programs, and may lead the buddy to watch the same broadcasting program as the user (operation 740). Also, the user can set a menu in order not to receive a recommendation from other buddies and thus not be disturbed while watching a broadcasting program (operation 760). For example, in the case of John in FIG. 6, there is a circled X next to an image of John so that the user may not transmit a recommendation message to John.

Meanwhile, when the user presses an EPG button (not shown) of a terminal while watching a broadcasting program (operation 750), the user may see an EPG. The user uses up/down/left/right buttons to scroll the EPG, thereby reaching a desired program. When the user determines whether there are broadcasting programs to recommend to a buddy (operation 755), and when the user selects a broadcasting program to recommend to the buddy and presses a recommendation menu, a buddy list may be enabled so that the user may select the buddy in the buddy list to whom the broadcasting program is to be recommended and the broadcasting program may be recommended (operation 740).

Figure 8:
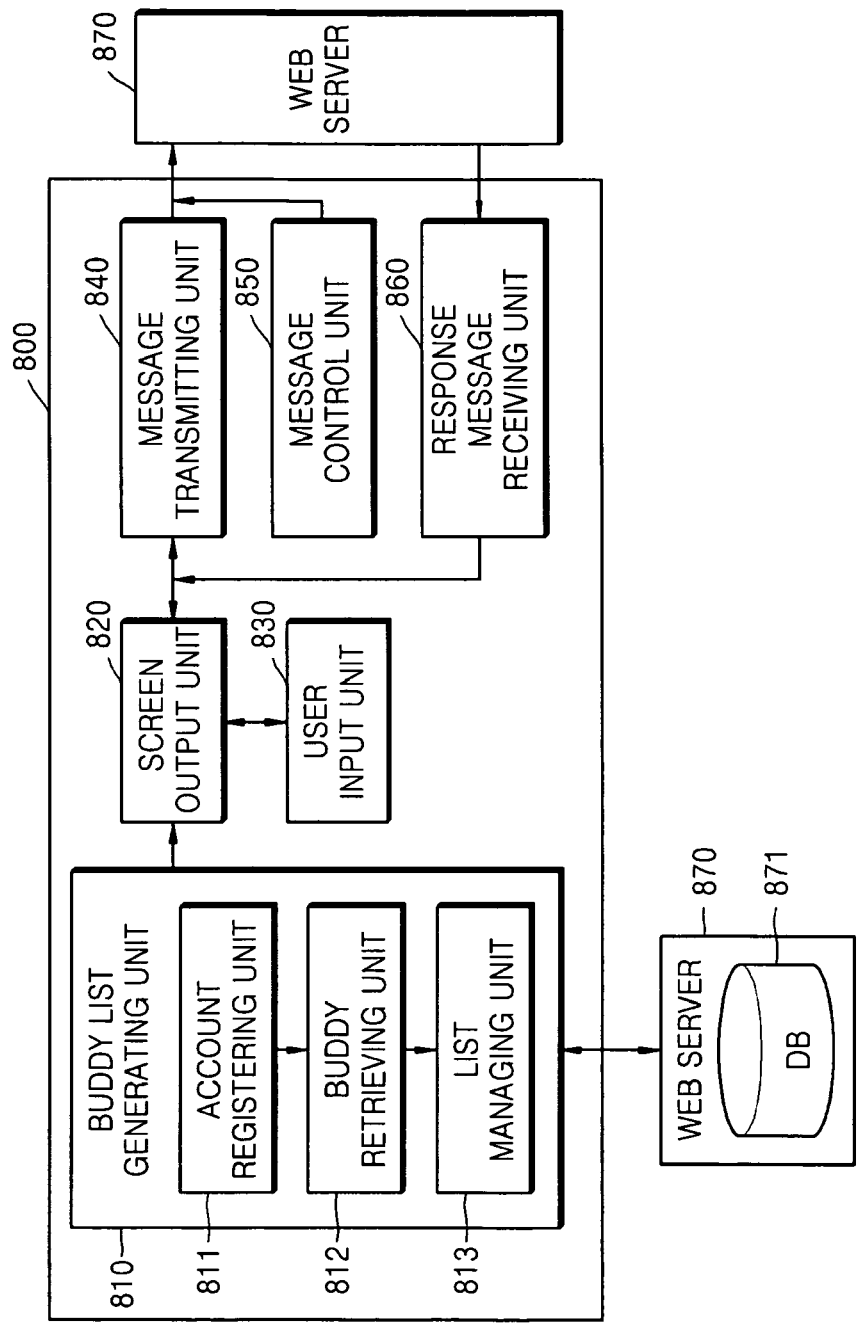
FIG. 8 is a block diagram of a broadcasting contents recommending apparatus in a multimedia contents reproducing device.

FIG. 8 is a block diagram of a broadcasting contents recommending apparatus 800 in a multimedia contents reproducing device, according to another embodiment.

Referring to FIG. 8, the broadcasting contents recommending apparatus 800 includes a buddy list generating unit 810 to generate a user list about one or more second users related to a first user, a screen output unit 820 to display the user list on a screen of the multimedia contents reproducing device, a user input unit 830 to select at least a third user from among the one or more second users in the user list, and a message transmitting unit 840 to transmit a recommendation message to the third user via a web server 870, wherein the recommendation message is related to recommending a first broadcasting content currently being watched by the first user, or a second broadcasting content selected from an EPG.

Here, the buddy list generating unit 810 may further include an account registering unit 811 to register an account of the first user in the web server 870 connected via a network, a buddy retrieving unit 812 to retrieve the one or more second users from the web server 870, and a list managing unit 813 to register the retrieved one or more second users in the account of the first user.

In addition, the broadcasting contents recommending apparatus 800 may further include a message control unit 850 to display an icon for notifying an arrival of the recommendation message on a screen of a multimedia contents reproducing device of the third user, and may further include a response message receiving unit 860 to receive a response message indicating whether the third user that has received the recommendation message agrees to watch the recommended first broadcasting content or the recommended second broadcasting content.

As described above, according to the one or more of the above embodiments, the buddy list of the buddies watching the same broadcasting program as the user, or the buddy list of the buddies watching different broadcasting programs than the user can be exhibited via the network while watching the broadcasting program. By using the buddy list, the user can notify a broadcasting program currently being watched by the user to a buddy who is watching a different broadcasting program than the user, and by using the EPG information, the user may recommend a broadcasting program. Since multimedia contents are provided these days in large amount, recommendation of a broadcasting program can be useful information to users that hesitate to select multimedia contents. Also, the user builds a social network by using the buddy list so that the user can feel that the user is watching the TV with others although the user is watching the TV alone, and after the broadcasting program has ended, the user can discuss the broadcasting program with the buddies who have watched the same broadcasting program, thereby forming a high rapport with them.

Meanwhile, the method of recommending broadcasting contents according to the one or more of the above embodiments can be written as computer programs and can be implemented in general-use digital computers that execute the programs using a computer readable recording medium.

In addition, a data structure used in the one or more of the above embodiments can be written in a computer readable recording medium through various means.

Examples of the computer readable recording medium include magnetic storage media (e.g., ROM, floppy disks, hard disks, etc.), and optical recording media (e.g., CD-ROMs, or DVDs).

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of recommending contents in a display apparatus comprising a display, the method comprising:
performing, by at least one processor of the display apparatus, operations comprising:
controlling the display to display an electronic program guide (EPG);
controlling the display to display groups of second users related to a first user according to a status of the respective second users, the groups including a first group of second users watching a same broadcasting program as the first user and second users about to start watching the same broadcasting program as the first user, and a second group of second users not watching the same broadcasting program as the first user, wherein the displaying the groups of second users includes:
controlling the display to display the first group of second users, together with a time one or more second users began watching the same broadcasting program as the first user; and
controlling the display to display the second group of second users not watching the same broadcasting program as the first user, together with a title of a broadcasting program being watched by one or more second users of the second group;
receiving a selection, by the first user, of a broadcasting program among one or more programs included in the EPG;
receiving a selection, by the first user, of at least one second user among the displayed groups of second users; and
transmitting a message to the selected at least one second user, wherein the message includes a message recommending the selected program among the one or more programs included in the EPG, without requiring the first user to separately retrieve the selected at least one second user when the first user transmits the message.

2. The method of claim 1, wherein the operations further comprise extracting the EPG from streams of broadcasting contents.

3. The method of claim 2, wherein the EPG comprises program information about at least one of broadcasting program which is currently being displayed on a device, broadcasting programs which are broadcast in other channels, and broadcasting programs to be broadcast at a later time.

4. The method of claim 1, wherein the operations further comprise generating a second user list comprising the second users, wherein the generating of the second user list comprises:
    registering an account of the first user in a server connected via a network;
    retrieving the second users from the server; and
    registering the retrieved second users in the account of the first user.

5. The method of claim 1, wherein the operations further comprise displaying the EPG based on an event input by the first user.

6. The method of claim 5, wherein the EPG is displayed on a broadcasting program which is being broadcast.

7. The method of claim 1, wherein the second group of second users not watching the same broadcasting program as the first user includes at least one of second users watching a different broadcasting program as the first user and second users with an off-line status.

8. The method of claim 1, wherein the operations further comprise controlling the display to display a second icon for indicating a recommendation refusal, for one or more second users in the second group that refuse to receive the message, wherein the message is not transmitted to the one or more second users displayed with the second icon for indicating the recommendation refusal.

9. A non-transitory computer readable recording medium having recorded thereon a program for executing the method of claim 1.

10. A broadcasting program recommending apparatus, the apparatus comprising:
    a display;
    at least one memory storing instructions; and
    at least one processor that executes the instructions to:
        control the display to display an electronic program guide (EPG) and groups of second users related to a first user according to a status of the respective second users, the groups including a first group of second users watching a same broadcasting program as the first user and second users about to start watching the same broadcasting program as the first user, and a second group of second users not watching the same broadcasting program as the first user, wherein the displaying of the groups of second users includes displaying the first group of second users, together with a time one or more second users began watching the same broadcasting program as the first user;
        receive a selection, by the first user, of a broadcasting program among one or more programs included in the EPG and a selection, by the first user, of at least one second user among the displayed groups of second users;
        transmit a message to the selected at least one second user, wherein the message comprising a message recommending the selected program among the one or more programs include in the EPG, without requiring the first user to separately retrieve the selected at least one second user when the first user transmits the message; and
        control the display to display a second icon for indicating a recommendation refusal, for one or more second users in the second group that refuse to receive the message, wherein the message is not transmitted to the one or more second users displayed with the second icon for indicating the recommendation refusal.

11. The apparatus of claim 10, wherein the at least one processor further executes the instructions to extract the EPG from streams of broadcasting contents.

12. The apparatus of claim 11, wherein the at least one processor further executes the instructions to control the display to display program information about at least one of broadcasting program which is currently being displayed, broadcasting programs which are broadcast in other channels, and broadcasting programs to be broadcast at a later time.

13. The apparatus of claim 10, wherein the at least one processor further executes the instructions to generate a second user list comprising the second users.

14. The apparatus of claim 13, wherein to generate the second user list, the at least one processor further executes the instructions to:
    register an account of the first user;
    retrieve the second users; and
    register the retrieved second users in the account of the first user.

15. The apparatus of claim 10, wherein the at least one processor further executes the instructions to control the display to display the EPG based on an event input by the first user.

16. The apparatus of claim 10, wherein the at least one processor further executes the instructions to control the display to display the EPG on a broadcasting program which is being broadcast.

17. The apparatus of claim 10, wherein the second group of second users not watching the same broadcasting program as the first user includes at least one of second users watching a different broadcasting program as the first user and second users with an off-line status.

18. The apparatus of claim 10, wherein the at least one processor further executes the instructions to control the display to display the second group of second users not watching the same broadcasting program as the first user, together with a title of a broadcasting program being watched by one or more second users of the second group.

* * * * *